(12) United States Patent
Cortigiani et al.

(10) Patent No.: US 9,756,691 B1
(45) Date of Patent: Sep. 5, 2017

(54) MODULATION ENGINE FOR DIMMING CONTROL

(71) Applicant: Infineon Technologies AG, Neubiberg (DE)

(72) Inventors: Fabrizio Cortigiani, Padua (IT); Maurizio Galvano, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/060,127

(22) Filed: Mar. 3, 2016

(51) Int. Cl.
  *H05B 37/00* (2006.01)
  *H05B 33/08* (2006.01)

(52) U.S. Cl.
  CPC ..... *H05B 33/0818* (2013.01); *H05B 33/0845* (2013.01)

(58) Field of Classification Search
  CPC H05B 41/2855; H05B 41/2851; B23H 1/024; B23H 1/026; H02H 7/1227
  USPC .............. 315/127–128, 170, 224, 291, 300
  See application file for complete search history.

(56) References Cited

U.S. PATENT DOCUMENTS

| 2014/0300274 A1* | 10/2014 | Acatrinei | H05B 33/0815 315/85 |
| 2015/0346265 A1* | 12/2015 | Koh | G01R 31/045 324/538 |
| 2016/0057825 A1* | 2/2016 | Hu | H05B 33/0815 315/201 |

OTHER PUBLICATIONS

"Infineon® Basic LED Driver, TLD1314EL, 3 Channel High Side Current Source," Infineon, Automotive, Data Sheet, Rev. 1.0, Aug. 8, 2013, 29 pp.
"NE555, NE555Y, SA555, SE555, SE555C, Precision Timers," Rochester Electronics LLC, Datasheet, Feb. 1992, 15 pp.
"Infineon® Basic LED Driver, TLD1315EL, 3 Channel High Side Current Source," Infineon, Automotive, Data Sheet, Rev. 1.0, Aug. 8, 2013, 34 pp.
Rosen, "LM3406, LM3409, Dimming Techniques for Switched-Mode LED Drivers," Texas Instruments, Literature No. SNVA605, 2009, 9 pp. (Applicant points out, in accordance with MPEP 609.04(a), that the year of publication, 2009, is sufficiently earlier than the effective U.S. filing date, Mar. 3, 2016, so that the particular month of publication is not in issue.).

* cited by examiner

*Primary Examiner* — Minh D A
(74) *Attorney, Agent, or Firm* — Shumaker & Sieffert, P.A.

(57) ABSTRACT

A modulation engine for a light-emitting-diode (LED) driver is described that includes an output port, a charge current source, a discharge current source, and an output control unit. The output control unit is configured to generate a modulation signal (e.g., a pulse-width-modulation signal) at the output port by at least alternating, based on a duty cycle of the modulation signal, between coupling the charge current source to the output port and the discharge current source to the output port to linearly shape the charge at the output port in accordance with the duty cycle.

14 Claims, 7 Drawing Sheets

MODULATION ENGINE FOR DIMMING CONTROL

BACKGROUND

Luminous flux, measured in lumens (lm), is defined as a quantity of energy of light emitted per second in all directions. In some systems, the amount of luminous flux emitted by light emitting diode (LED) devices or LED modules may be controlled through various dimming techniques.

For example, some systems may perform digital dimming of an LED device or module by varying the duty cycle of a pulse width modulation (PWM) control signal that is used to drive the LED device. Such a system may vary the duty cycle to cause a proportional variation to the amount of luminous flux associated with the LED device. In addition, or as an alternative to performing digital dimming techniques, some systems may perform analog dimming of an LED device by controlling the amount of forward current provided to the LED device. An adjustment to the amount of forward current associated with an LED device may induce a proportional adjustment to the amount of luminous flux associated with the LED device.

In any case, no matter the technique used to perform LED dimming, most systems require tight control of over their respective dimming parameters (e.g., duty cycle, amount of forward current, or other parameters) to satisfy the luminous flux requirements of a particular application. For example, most automotive lighting applications are required to operate over a wide temperature range (e.g., 40° C. to 115° C.). If performing digital dimming, a PWM engine of an automotive lighting application may need to dynamically adjust the PWM duty cycle (e.g., by plus or minus percent) to compensate for temperature changes so as to maintain a steady amount of luminous flux. Maintaining such tight control over the PWM duty cycle may be challenging for some systems, particularly those systems where an expensive microcontroller driven PWM engine is not an option.

SUMMARY

In one example, the disclosure is directed to a modulation engine for a light-emitting-diode (LED) driver is described that includes an output port; a charge current source; a discharge current source; and an output control unit that is configured to generate a modulation signal at the output port by at least alternating, based on a duty cycle of the modulation signal, between coupling the charge current source to the output port and the discharge current source to the output port to linearly shape the charge at the output port in accordance with the duty cycle.

In another example, the disclosure is directed to a system is described that includes an LED driver configured to receive a modulation signal at an input of the LED driver, and a modulation engine configured to generate the modulation signal at the input of the LED driver by at least alternating, based on a duty cycle of the modulation signal, between charging the input of the LED driver and discharging the input of the LED driver to linearly shape a charge at the input of the LED driver in accordance with a duty cycle of the modulation signal.

In another example, the disclosure is directed to a system is described that includes means for generating a modulation signal at an input of a driver of one or more LED devices, and means for alternating, based on a duty cycle of the modulation signal, between charging the input of the driver and discharging the input of the driver to linearly shape a charge at the input of the driver in accordance with a duty cycle of the modulation signal.

The details of one or more examples are set forth in the accompanying drawings and the description below. Other features, objects, and advantages of the disclosure will be apparent from the description and drawings, and from the claims.

DETAILED DESCRIPTION

In general, circuits and techniques are described for enabling a modulation engine (e.g., a pulse width modulation (PWM) engine, a pulse density modulation engine (PDM), or other type of engine that produces a modulation signal) to control, with great accuracy, the duty cycle of a modulation signal without necessarily relying on a microcontroller or a precise reference oscillator. An example system may include a PWM engine configured to generate, at a PWM output pin, a PWM signal for a driver of a light emitting diode (LED) device (or module). The duty cycle of the PWM signal may by a dimming parameter used by the system to control the amount of luminous flux associated with the LED device. The PWM engine may be configured to provide the PWM signal with a very accurate duty cycle by charging or discharging the PWM output pin at a near constant charge or discharge rate. By constantly charging or discharging the PWM output pin in accordance with the duty cycle, the PWM engine may maintain very precise control over the amount of dimming at the LED device.

Although the techniques and circuits are described herein primarily in the context of PWM, the techniques may also be applicable to other types of modulation engines and modulation signals. For example, in some instances, the techniques and circuits may be applicable to PDM engines and signals, pulse-position modulation (PPM) engines and signals, pulse-amplitude modulation (PAM) engines and signals, pulse-code modulation (PCM) engines and signals, and any other suitable modulation techniques.

Figure 1:
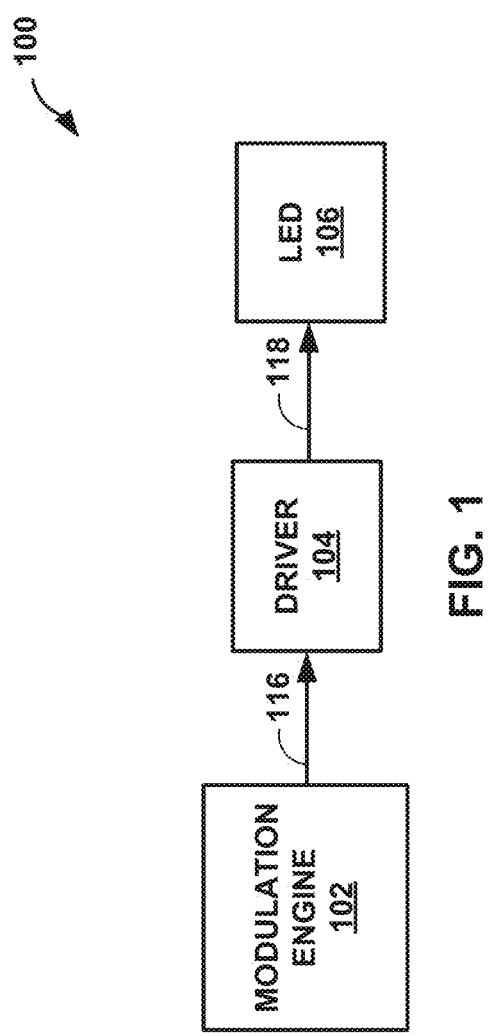
FIG. 1 is a conceptual diagram illustrating an example system for driving one or more light emitting diode devices, in accordance with one or more aspects of the present disclosure.

FIG. 1 is a conceptual diagram illustrating system 100 as an example system for driving one or more LED devices, in accordance with one or more aspects of the present disclosure. Numerous examples of system 100 exists and may include, but are not limited to, vehicle lighting systems, interior and exterior building lighting systems, and any and all other types of portable and non-portable lighting systems, sub-systems, or components thereof that require an accurate PWM signal to control dimming characteristics of one or more LED modules or devices.

In the example of FIG. 1, system 100 includes PWM engine 102, driver 104, and LED device or module 106 (referred to simply as "LED 106"). PWM engine 102 is electrically coupled to driver 104 via link 116. Driver 104 is electrically coupled to LED 106 via link 118. Links 116 and 118 may be any type of wired or wireless link for transmitting electrical signals (e.g., a current or a voltage) between components, such as a PWM engine and an LED driver, and an LED driver and one or more LEDs.

LED 106 may be one or more individual LED devices (or components), or may be one or more LED modules or LED strings that include one or more LED devices and other electrical components. In any case, LED 106 represents any type of electrical device that is configured to emit light with an associated amount of luminous flux that can be digitally controlled based on the duty cycle of a PWM signal. In other words, LED 106 may be configured to have a dimming attribute that is defined by the duty cycle of the PWM drive signal received from driver 104.

LED 106 is configured to receive a drive signal (e.g., a forward current) as input via link 118 from driver 104, and in response, emit light. The dimming attribute, or amount of luminous flux, associated with LED 106 is based on the time-averaged forward current associated with the drive signal at link 118. To control the time-averaged forward current at link 118, system 100 may cause driver 104 to produce a PWM based drive signal that has a specific duty cycle. Since the time-averaged current associated with the drive signal at link 118 is proportional to the duty cycle of the PWM drive signal, the dimming or amount of luminous flux generated by LED 106 is also proportional to the duty cycle of the PWM drive signal.

Driver 104 is an LED driver configured to receive a PWM signal at an input of driver 104 and generate a drive signal at an output of drier 104, based on the PWM signal, to drive LED 106. Although shown as a single driver, driver 104 may include one or more LED drivers.

The input of driver 104 is coupled to link 116 and the output of driver 104 is coupled to link 118. Driver 104 may be considered a switch-based driver that is configured to receive the PWM signal via link 118 from PWM engine 102 and in response, generate a drive signal at link 118. In some examples, the input of driver 104 may be configured to accept a variety of PWM signals that cover a wide range of frequencies and amplitudes. Driver 104 may include or may be coupled to one or more voltage or current sources (not shown) that provide driver 104 with the current used to drive LED 106. The amount of current associated with the drive signal that driver 104 outputs at link 118 may be proportional to the duty cycle of the PWM signal that driver 104 receives at link 116. Driver 104 may be configured to receive the PMW signal at the input of driver 104 from PWM engine 102.

PWM engine 102 represents a component of system 100 that is responsible for generating a PWM signal with a precise duty cycle needed by driver 104 to drive LED 106 and cause LED 106 to emit light with a particular amount of luminous flux or brightness. PWM engine 102 may output a PWM signal at link 116 that driver 104 uses to generate a drive signal for driving LED 106. PWM engine may vary the duty cycle of the PWM signal at link 116 to affect the current associated with the drive signal generated by driver 104, and therefore, effect the amount of luminous flux produced by LED 106. Examples of PWM engine 102 are described in greater detail below with respect to the additional FIGS. however in some examples, PWM engine 102 may rely on an oscillator, an astable timer, a microcontroller, and/or any other components required to produce a PWM signal at link 116 that causes driver 104 to generate a drive signal with a corresponding duty cycle at link 118.

Figure 2:
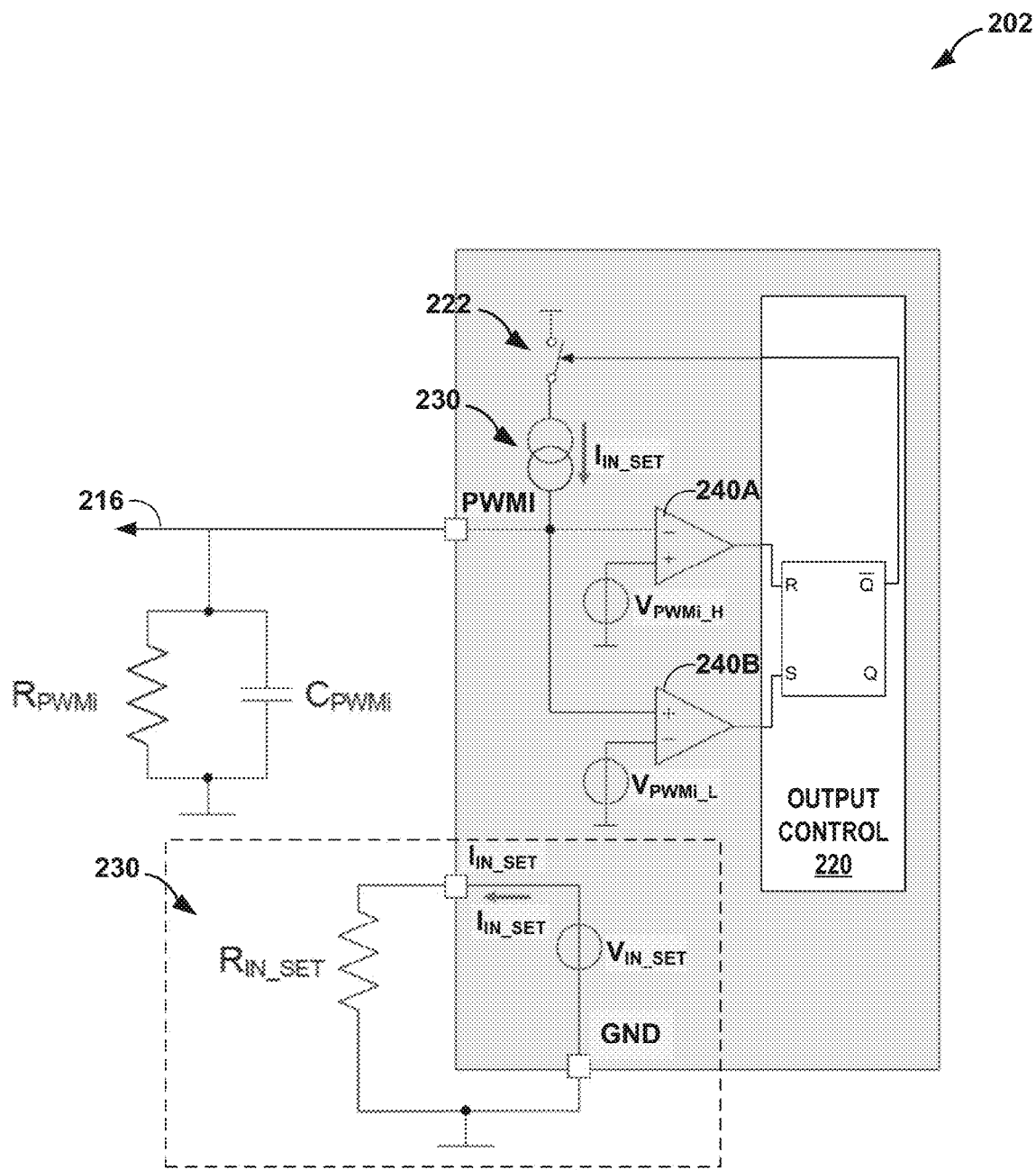
FIG. 2 is a conceptual diagram illustrating an example of the modulation engine of the example system of FIG. 1.

FIG. 2 is a conceptual diagram illustrating PWM engine 202 as one example of PWM engine 102 of system 100 of FIG. 1. FIG. 2 is described in the context of system 100 of FIG. 1.

PWM engine 202 represents an astable timer based PWM engine that relies primarily on an internal current source 230 as a reference (which may be programmable via external resistor $R_{IN\_SET}$) and an external RC network (e.g., $R_{PWMi}$ and $C_{PWMi}$).

Being an astable timer based PWM engine, PWM engine 202 continually switches between outputting a PWM signal that is either increasing to a first reference voltage $V_{PWMi\_H}$ or decreasing to a second reference voltage $V_{PWMi\_L}$. Many other examples of astable timer configurations exist. For example, the common "555 timer IC" or "555 chip timer" is another example of an astable timer, however, unlike the design shown in FIG. 2, the 555 chip timer is based on a resistor ladder reference and other external components.

PWM engine 202 includes an output pin labeled "PWMI". The PWMI output of PWM engine 202 is configured to be coupled (e.g., via link 216) to an LED driver, such as driver 104. Also coupled to the PWMI output of PWM engine 202, PWM engine 202 includes an RC network made up of resistor $R_{PWMi}$ and capacitor $C_{PWMi}$.

PWM engine 202 includes current source 230 coupled to the PMWI output. Current source 230 is selectively controllable via switch 222 such that when switch 222 is enabled or closed, the current $I_{IN\_SET}$ produced by current source 230 charges the PWMI output and capacitor $C_{PWMi}$. When switch 222 is disabled or opened, current source 230 no longer produces current $I_{IN\_SET}$ and therefore, the PWMI output and capacitor $C_{PWMi}$ are allowed to discharge at a rate defined by the time constant associated with the RC network of resistor $R_{PWMi}$ and capacitor $C_{PWMi}$.

Current source 230 is made up of external resistor $R_{IN\_SET}$ and constant reference voltage $V_{IN\_SET}$. The amount of current produced by current source 230 when switch 222 is enabled is based on the value of external resistor $R_{IN\_SET}$. The external resistor $R_{IN\_SET}$ enables current source 230 to be "programmable" or reconfigurable such the amount of current that current source 230 is able to produce can be changed by changing the amount of resistance associated with the external resistor $R_{IN\_SET}$. Changing the resistance of resistor $R_{IN\_SET}$, and thereby changing the amount of current being output by current source 230 when charging the PWMI output, may change the duty cycle of the PWM signal being output at link 216.

PWM engine 202 includes comparators 240A and 240B. The negative input of comparator 240A is coupled to threshold voltage $V_{PWMi\_H}$ and the positive input of comparator 240A is coupled to the PWMI output. Threshold voltage $V_{PWMi\_H}$ represents a reference voltage source that outputs the maximum or peak voltage level that the PWM signal is allowed to reach during a first phase of the PWM signal at the PWMI output. The positive input of comparator 240B is coupled to threshold voltage $V_{PWMI\_L}$ and the negative input of comparator 240B is coupled to the PWMI output. Threshold voltage $V_{PWMI\_L}$ represents the minimum or "zero" voltage that the PWM signal is allowed to reach during the second phase of the PWM signal at the PWMI output. The outputs of comparators 240A and 240B are both coupled to output control unit 220.

PWM engine 202 further includes output control unit 220. Output control unit 220 represents a circuit, unit, logic, or module that controls switch 222 based on the outputs of comparators 240A and 240B. In the example of FIG. 2, output control unit 220 is shown as being a D-Flip Flop however in other examples, output control may be hardware, software, firmware, or any combination thereof.

At the start of operations, the logic or circuitry of output control unit 220 may cause switch 222 to close and in response, charge $C_{PWMi}$; and cause the voltage at the PWMI output to increase to $V_{PWMi\_H}$. When the voltage at the PWMI output has reached $V_{PWMi\_H}$, output control unit 220 causes, based on the outputs from comparators 240A and 240B, switch 222 to open, causing capacitor $C_{PWMi}$ to discharge and the voltage at the PWMI output to decrease back towards $V_{PWMI\_L}$. When the voltage at the PWMI output has reached $V_{PWMI\_L}$, the outputs from comparators 240A and 240B may cause output control unit 220 to close switch 222, thereby causing capacitor $C_{PWMi}$ to re-charge, and again cause the voltage at the PWMI output to increase back towards $V_{PWMI\_H}$. Output control unit 220 may cause switch 222 to automatically open and close in this way so as to produce a PWM signal at link 216 that bounces between $V_{PWMI\_L}$ and $V_{PWMI\_H}$.

Figure 3:
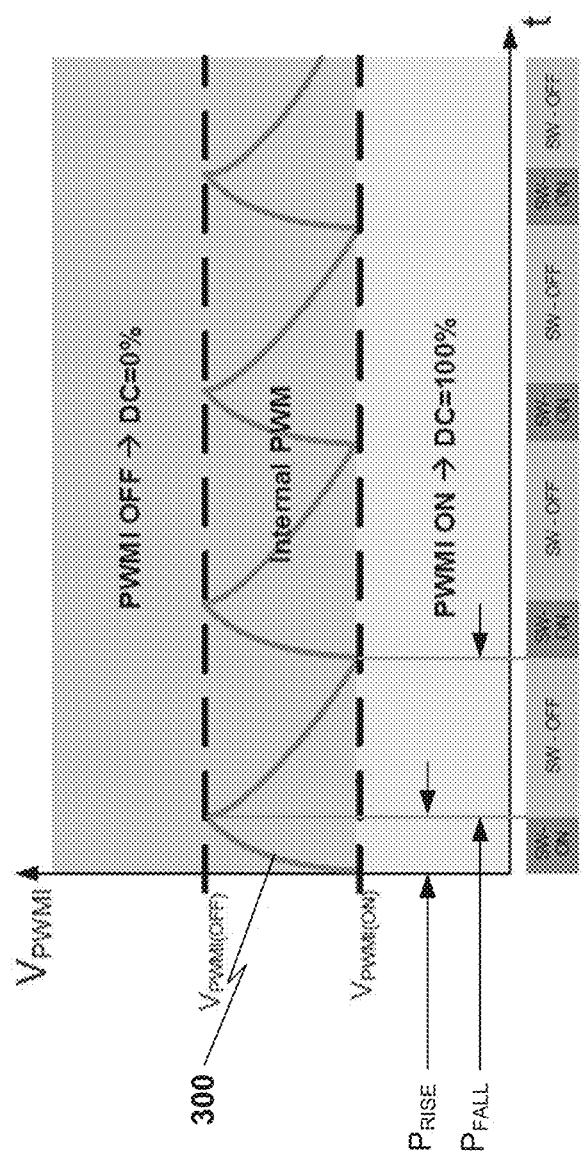
FIG. 3 is a conceptual diagram illustrating a voltage waveform of an example pulse width modulation signal produced by the example modulation engine of FIG. 2.

FIG. 3 is a conceptual diagram illustrating voltage waveform 300 of an example pulse width modulation signal produced by PWM engine 202 of FIG. 2. In other words, waveform 300 represents the PWM signal that PWM engine 202 may produce at the PWMI output and at link 216.

Waveform 300 illustrates some of the drawbacks of PWM engine 202 and other similar types of PWM engines. That is, waveform 300 shows how the duty cycle and frequency of a PWM output from a PWM engine like that of FIG. 2 may not be sufficiently accurate for some applications. As shown in FIG. 3, the inaccuracies of PWM engines, such as PWM engine 202, are partially a result of the associated charge and discharge timings at their respective PWM outputs being non-linear and being sensitive to a variety of factors. For example, as described above, the accuracy of the frequency and duty cycle of other PWM engines may depend on the accuracy of the voltage thresholds $V_{PWMI\_L}$ and $V_{PWMI\_H}$ and resistor $R_{PWMi}$. Inaccuracies or inconsistencies in the voltage thresholds $V_{PWMI\_L}$ and $V_{PWMI\_H}$ and resistor $R_{PWMi}$ may cause wide variations from one PWM engine to another in their respective duty cycle accuracies and frequency. Consider EQS. 1 and 2. EQ. 1 defines the voltage $V_{PWMi_{rise}}$ at the PWMI output of PWM engine 202 during the rising phase $P_{RISE}$ of the PWM signal produced by PWM engine 202. EQ. 2 defines the voltage $V_{PWMi_{fall}}$ at the PWMI output of PWM engine 202 during the falling phase $P_{FALL}$ of the PWM signal produced by PWM engine 202.

$$V_{PWMi_{rise}}(t) = R_{PWMi} \times I_{PWMi} + (V_{PWMi_L} - R_{PWMi} \times I_{PWMi}) \times e^{\frac{-t}{R_{PWMi} \times C_{PWMi}}} \quad \text{EQ. 1}$$

$$V_{PWMi_{fall}}(t) = V_{PWMi_H} \times e^{\frac{-t}{R_{PWMi} \times C_{PWMi}}} \quad \text{EQ. 2}$$

As shown by EQS. 1 and 2, particularly when the voltage thresholds $V_{PWMi\_H}$ and $V_{PWMi\_L}$ reach near zero or near maximum voltage levels, any small variation or change in the $R_{PWMi}$ or $C_{PWMi}$ terms can cause large variations in the rise and fall timings (e.g., as the exponential is flatter when close to the asymptotic value).

Accordingly, drawbacks of PWM engine 202 (and similar PWM engines such as PWM engines that rely on the 555 chip timer) include being very sensitive to: absolute values of comparator thresholds (e.g., $V_{PWMi\_H}$ and $V_{PWMi\_L}$), absolute value of hysteresis, and variations in RC network characteristics (e.g., $R_{PWMi}$ or $C_{PWMi}$). As such, the variations in charge and discharge timings of PWM engine 202 and other similar PWM engines may negatively affect the accuracy of the frequency and duty cycle of their respective PWM output. Furthermore, the accuracy of the frequency and duty cycle of the PWM output produced by the astable configuration of PWM engine 202 can also be very sensitive to the accuracy of internal current source 230. For instance, minor variations in the current output from internal current source 203 may lead to a wide variation in frequency and duty cycle in the PWM signal being output by PWM engine 202.

Figure 4:
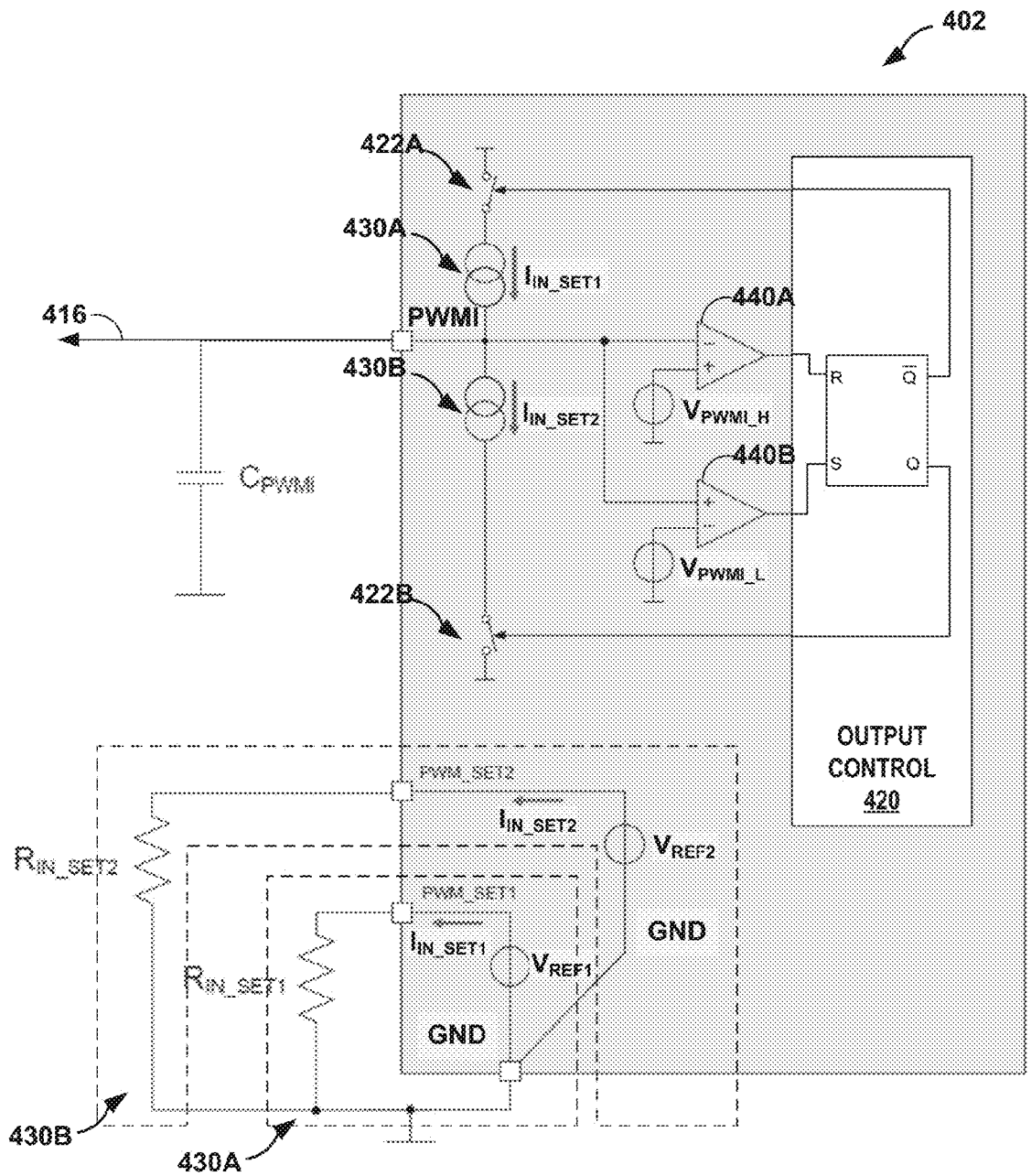
FIG. 4 is a conceptual diagram illustrating an example modulation engine of the example system of FIG. 1, in accordance with one or more aspects of the present disclosure.

FIG. 4 is a conceptual diagram illustrating PWM engine 402 as an example pulse width modulation engine of the example system of FIG. 1, in accordance with one or more aspects of the present disclosure. FIG. 4 is described in the context of system 1 of FIG. 1. The frequency and duty cycle of the PWM signal that PWM engine 402 outputs at the PWMI output at link 416 is more accurate and less susceptible to variation than the frequency and the duty cycle of the PWM signal produced by PWM engine 202 and other PWM engines.

PWM engine 402 uses two reference current sources 430A and 430B to charge and discharge capacitor $C_{PWMi}$ around voltage thresholds $V_{PWMi\_H}$ and $V_{PWMi\_L}$. Use of current sources 430A and 430B in this way results in a steady, linear charge and discharge of the PWMI output.

PWM engine 402 includes an output pin labeled "PWMI". The PWMI output of PWM engine 402 is configured to be coupled (e.g., via link 416) to an LED driver, such as driver 104. Also coupled to the PWMI output of PWM engine 402, PWM engine 402 includes capacitor $C_{PWMi}$ (and omits resistor $R_{PWMi}$).

PWM engine 402 includes current sources 430A and 430B coupled to the PMWI output. Current source 430A is configured as a charge current source and current source 430B is configured as a discharge current source. When enabled, current source 430A is configured to produce current $I_{IN\_SET1}$ to charge the PWMI output and, when enabled, current source 430B is configured to produce current $I_{IN\_SET2}$ to discharge the PWMI output.

Current source 430A includes resistor $R_{IN\_SET1}$ in series with reference voltage VREF1. Current source 430B includes resistor $I_{IN\_SET2}$ in series with reference voltage VREF2. When switch 422A is closed, current source 430A is coupled to GND, thereby completing a circuit and producing current $I_{IN\_SET1}$. When switch 422B is closed, current source 430B is coupled to GND, thereby completing a circuit and producing current $I_{IN\_SET2}$.

Current source 430A is selectively controllable via switch 422A such that when switch 422A is enabled or closed, the current $I_{IN\_SET1}$ produced by current source 430A charges the PWMI output and capacitor $C_{PWMi}$. When switch 422A is disabled or opened, current source 430A stops producing current $I_{IN\_SET1}$ and therefore stops charging capacitor $C_{PWMi}$. Current source 430B is selectively controllable via switch 422B such that when switch 422B is enabled or closed, the current $I_{IN\_SET2}$ produced by current source 430B discharges the PWMI output and capacitor $C_{PWMi}$. When switch 422B is disabled or opened, current source 430B stops producing current $I_{IN\_SET2}$ and therefore stops discharging capacitor $C_{PWMi}$.

Current source 430A is made up of external resistor $R_{IN\_SET1}$ and constant reference voltage $V_{REF1}$. The amount of current produced by current source 430A when switch 422A is enabled is based on the value of external resistor $R_{IN\_SET1}$. Current source 430B is made up of external resistor $R_{IN\_SET2}$ and constant reference voltage $V_{REF2}$. The amount of current produced by current source 430B when switch 422B is enabled is based on the value of external resistor $R_{IN\_SET2}$.

External resistors $R_{IN\_SET1}$ and $R_{IN\_SET2}$ enable current sources 430A and 430B to be "programmable" or reconfigurable such the amount of current that current sources 430A and 430B are able to produce can be changed by changing the amount of resistance associated with the external resistor $R_{IN\_SET1}$ and $R_{IN\_SET2}$. Changing the resistances of resistors $R_{IN\_SET1}$ and $R_{IN\_SET2}$, and thereby changing the amount of current being output by current sources 430A and 430B when charging or discharging the PWMI output, may change the duty cycle of the PWM signal being output at link 416. In some examples, resistors $R_{IN\_SET1}$ and $R_{IN\_SET2}$ may be reference pins that may share other functions of PWM engine 402. In other words, other components of PWM engine 402 may use resistors $R_{IN\_SET1}$ and $R_{IN\_SET2}$ for other functionality, in addition to current sources 430A and 430B using resistors $R_{IN\_SET1}$ and $R_{IN\_SET2}$ to produce currents $I_{IN\_SET1}$ and $I_{IN\_SET1}$.

PWM engine 402 includes comparators 440A and 440B. The negative input of comparator 440A is coupled to threshold voltage $V_{PWMI\_H}$ and the positive input of comparator 440A is coupled to the PWMI output. Threshold voltage $V_{PWMI\_H}$ represents a reference voltage source that outputs the maximum or peak voltage level that the PWM signal is allowed to reach during a first phase of the PWM signal at the PWMI output. The positive input of comparator 440B is coupled to threshold voltage $V_{PWMI\_L}$ and the negative input of comparator 440B is coupled to the PWMI output. Threshold voltage $V_{PWMI\_L}$ represents the minimum or "zero" voltage that the PWM signal is allowed to reach during the second phase of the PWM signal at the PWMI output. The outputs of comparators 440A and 440B are both coupled to output control unit 420.

Output control unit 420 represents a circuit, unit, logic, or module that controls switches 422A and 422B based on the outputs of comparators 440A and 440B. In the example of FIG. 4, output control unit 420 may include a D-Flip Flop, however in other examples, output control unit 420 may be any combination of hardware, software, firmware, or any combination thereof. Output control unit 420 may control switches 422A and 422B such that current sources 430A and 430B alternate between charging and discharging capacitor $C_{PWMi}$ and the PWMI output.

Output control unit 420 is configured to generate a PWM signal at the PMWI output (port) by at least alternating, based on a duty cycle of the PWM signal, between coupling charge current source 430A to the PWMI output port and discharge current source 430B to the PWMI output port to linearly shape the charge at the PWMI output port in accordance with the duty cycle. Output control unit 420 may be configured to alternate between coupling charge current source 430A to the PWMI output and discharge current source 430B to the PWMI output by opening and closing switches 422A and 422B in accordance with the duty cycle.

For example, at the start of operations, the logic or circuitry of output control unit 420 may open switch 422B to disable current source 430B and close switch 422A to enable current source 430A. In other words, output control unit 420 may close switch 422A after opening switch 422B during a first phase of the PWM signal. By opening switch 422B and closing switch 422A in this way, output control unit 420 may charge capacitor $C_{PWMi}$ based on the current $I_{IN\_SET1}$ from current source 430A and cause the voltage at the PWMI output to increase to $V_{PWMI\_H}$.

When the voltage at the PWMI output has reached $V_{PWMI\_H}$, output control unit 420 may open, based on the outputs from comparators 440A and 440B, switch 422A to disable current source 430A and close switch 422B to enable current source 430B. In other words, output control unit 420 may open switch 422A prior to closing switch 422B during a second phase of the PWM signal. By opening switch 422A and closing switch 422B in this way, output control unit 420 may cause capacitor $C_{PWMi}$ to discharge based on the current $I_{IN\_SET2}$ from current source 430B and further cause the voltage at the PWMI output to decrease back towards $V_{PWMI\_L}$.

When the voltage at the PWMI output has reached $V_{PWMI\_L}$, output control unit 420 may again open, based on the outputs from comparators 440A and 440B, switch 422B and close switch 422A to cause capacitor $C_{PWMi}$ to re-charge based on the current $I_{IN\_SET1}$ from current source 430A, and again cause the voltage at the PWMI output to increase back towards $V_{PWMi\_H}$. Output control unit 420 may cause switches 422A and 422B to automatically open and close in this way so as to produce a PWM signal at link 416 that bounces between $V_{PWMI\_L}$ and $V_{PWMI\_H}$. However, unlike the PWM signal produced by PWM engine 202, the PWM signal produced by PWM engine 402 may have a very accurate duty cycle and frequency that is less sensitive to variations in absolute values of comparator thresholds (e.g., $V_{PWMi\_H}$ and $V_{PWMi\_L}$), absolute value of hysteresis, variations in RC network characteristics, or variations in the current output from current sources 430A and 430B.

Said differently, in some examples, output control unit 420 is configured to couple charge current source 430A to the PWMI output by closing switch 422A which couples charge current source 430A to a reference potential (e.g., in this example GND), and output control unit 420 is configured to decouple charge current source 430A from the PWMI output by opening switch 422A. And in some examples, output control unit 420 is configured to couple discharge current source 430B to the PWMI output by closing switch 422B which couples discharge charge current 430B source to the reference potential (e.g., GND) and is configured to decouple discharge current source 430B from the PWMI output by opening switch 422B.

Figure 5:
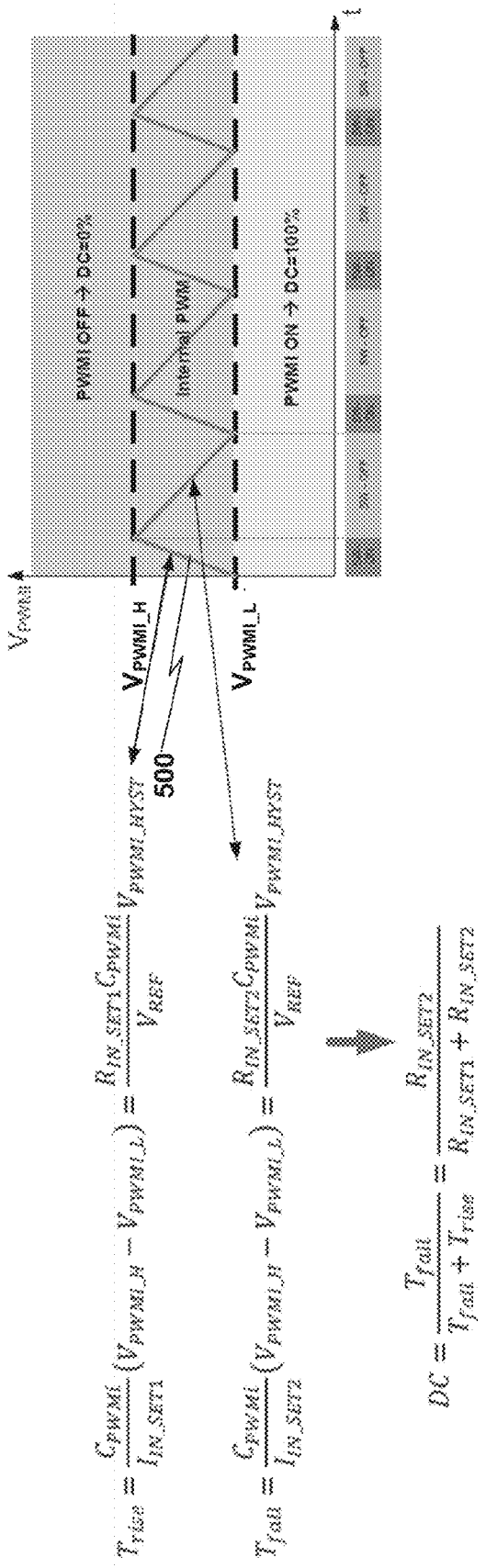
FIG. 5 is a conceptual diagram illustrating a voltage waveform of an example pulse width modulation signal produced by the example modulation engine of FIG. 4, in accordance with one or more aspects of the present disclosure.

FIG. 5 is a conceptual diagram illustrating voltage waveform 500 of an example PWM signal produced by PWM engine 402 of FIG. 4, in accordance with one or more aspects of the present disclosure. In other words, waveform 500 represents the PWM signal that PWM engine 402 may produce at the PWMI output and at link 416.

Waveform 500 illustrates some of the advantages of PWM engine 402 over other types of PWM engines, such as PWM engine 202 of FIG. 2. As shown in FIG. 5, PWM engine 402 may output a PWM signal at the PWMI output of PWM engine 402 at a linear (or near linear) charge and discharge rate. Therefore, PWM engine 402 may be considered to be more accurate (at least with regards to duty cycle and frequency by maintaining a steady duty cycle and frequency) than other types of PWM engines, such as PWM engine 202, that typically have non-linear charge and discharge timings at their respective PWM outputs.

Consider EQS. 3-5. EQ. 3 defines the rise time $T_{rise}$ associated with the PWM signal that PWM engine 402 outputs at the PMWI output. EQ. 4 defines the fall time $T_{fall}$ associated with the PWM signal that PWM engine 402 outputs at the PMWI output. And EQ. 5 defines the duty cycle DC of the PWM signal that PWM engine 402 outputs at the PMWI output.

$$T_{rise} = \frac{C_{PWMi}}{I_{IN\_SET1}}(V_{PWMI\_H} - V_{PWMI\_L}) = \frac{R_{IN\_SET1}C_{PWMi}}{V_{REF}}V_{PWMI\_HYST} \quad \text{EQ. 3}$$

$$T_{fall} = \frac{C_{PWMi}}{I_{IN\_SET2}}(V_{PWMI\_H} - V_{PWMI\_L}) = \frac{R_{IN\_SET2}C_{PWMi}}{V_{REF}}V_{PWMI\_HYST} \quad \text{EQ. 4}$$

$$DC = \frac{T_{fall}}{T_{fall} + T_{rise}} = \frac{R_{IN\_SET2}}{R_{IN\_SET1} + R_{IN\_SET2}} \quad \text{EQ. 5}$$

As shown by EQS. 3-5, regardless as to whether the voltage thresholds $V_{PWMi\_H}$ and $V_{PWMi\_L}$ reach near zero or near maximum voltage levels, the duty cycle (DC) of the accuracy of the duty cycle of the PWM signal being output by PWM engine 402 at link 416 is only dependent on the relationship between the external resistors $R_{IN\_SET1}$ and $R_{IN\_SET2}$. EQ. 5 shows that PWM engine 402 may output a PWM signal at the PWMI output that has a duty cycle which is defined by a ratio between a second resistance $R_{IN\_SET2}$ of the discharge current source 430B and a sum of a first resistance $R_{IN\_SET1}$ of the charge current source 430A and the second resistance $R_{IN\_SET2}$ of the discharge current source 430B.

Accordingly, PWM engine 402 does not suffer the drawbacks that PWM engine 202 and other types of PWM engines may have (e.g., being very sensitive to: absolute values of comparator thresholds, absolute value of hysteresis, and variations in RC network characteristics). By producing a PWM signal that has a duty cycle defined by EQ. 5, PWM engine 402 is configured to charge and discharge the PWMI output at a constant (or near constant) rate.

Figure 6:
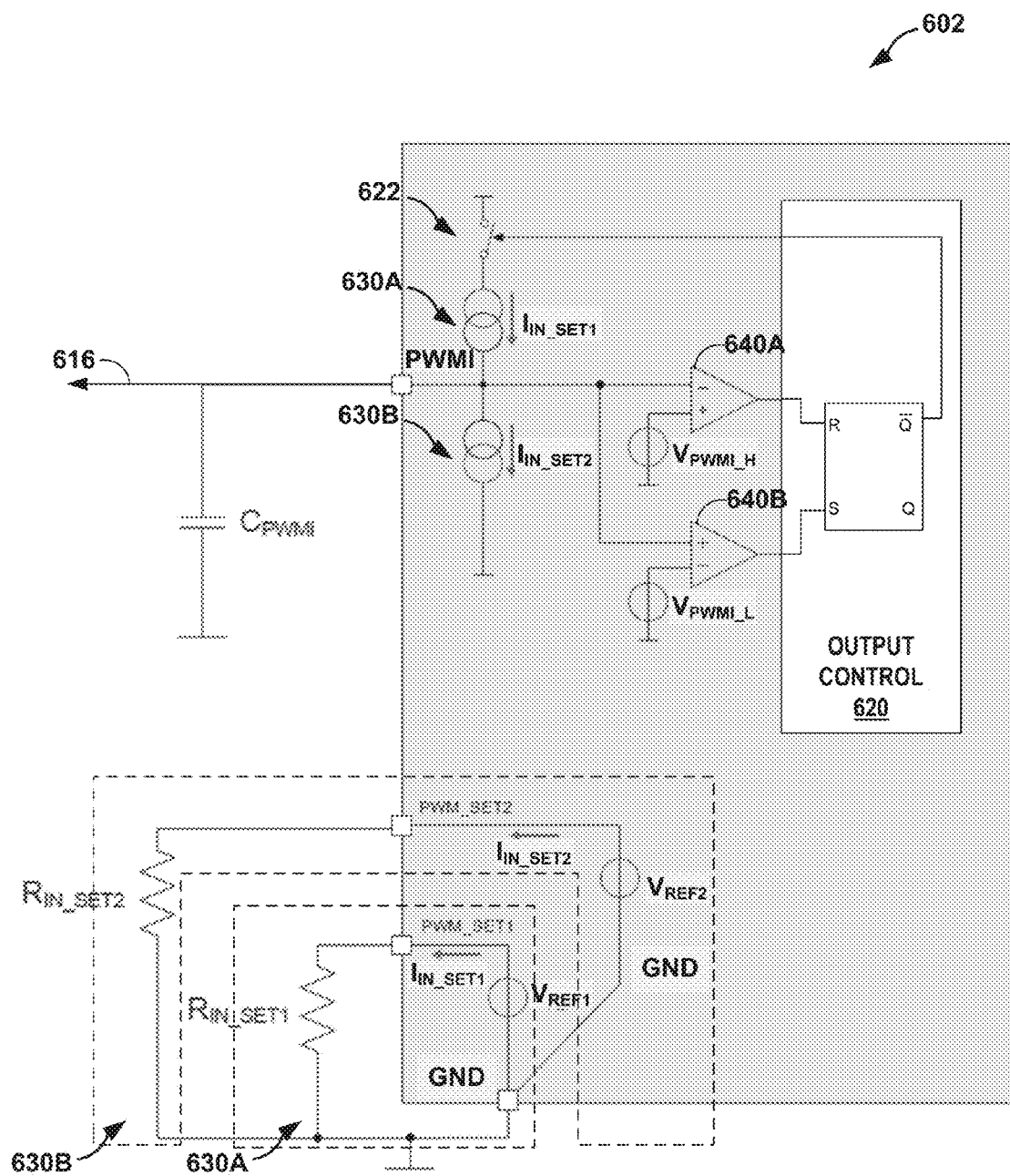
FIG. 6 is a conceptual diagram illustrating an example modulation engine of the example system of FIG. 1, in accordance with one or more aspects of the present disclosure.

FIG. 6 is a conceptual diagram illustrating PWM engine 602 as an example pulse width modulation engine of the example system of FIG. 1, in accordance with one or more aspects of the present disclosure. FIG. 6 is described in the context of system 1 of FIG. 1. PWM engine 602 represents and additional example PWM engine that is configured to produce a PWM signal at the PWMI output at link 616 with a duty cycle and frequency that is more accurate and less susceptible to variation than the frequency and the duty cycle of the PWM signal produced by PWM engine 202 and other PWM engines.

PWM engine 602 uses two reference current sources 630A and 630B to charge and discharge capacitor $C_{PWMi}$ around voltage thresholds $V_{PWMi\_H}$ and $V_{PWMi\_L}$. Use of current sources 630A and 630B in this way results in a steady, linear charge and discharge of the PWMI output.

PWM engine 602 includes an output pin labeled "PWMI". The PWMI output of PWM engine 602 is configured to be coupled (e.g., via link 616) to an LED driver, such as driver 104. Also coupled to the PWMI output of PWM engine 602, PWM engine 602 includes capacitor $C_{PWMi}$ (and omits resistor $R_{PWMi}$).

PWM engine 602 includes current sources 630A and 630B coupled to the PMWI output. Current source 630A is configured as a selectable, charge current source and current source 630B is configured as a constant, discharge current source. When enabled, current source 630A is configured to produce current $I_{IN\_SET1}$ to charge the PWMI output whereas current source 630B is configured to constantly discharge the PWMI output by producing current $I_{IN\_SET2}$. In other examples, current source 630B may be configured as a selectable, charge current source and current source 630A may be configured as a constant, discharge current source.

Current source 630A includes resistor $R_{IN\_SET1}$ in series with reference voltage $V_{REF1}$. Current source 630B includes resistor $R_{IN\_SET2}$ in series with reference voltage $V_{REF2}$. When switch 622 is closed, current source 630A is coupled to GND, thereby completing a circuit and producing current $I_{IN\_SET1}$. Regardless of whether switch 622 is open or close, current source 630B is always coupled to GND, thereby completing a circuit for continuously producing current $I_{IN\_SET2}$.

Current source 630A is selectively controllable via a single switch 622 such that when switch 622 is enabled or closed, the current $I_{IN\_SET1}$ produced by current source 630A charges the PWMI output and capacitor $C_{PWMi}$ at the same time that the current $I_{IN\_SET2}$ produced by current source 630B discharges the PWMI output and capacitor $C_{PWMi}$. When switch 622 is disabled or opened, current source 630A stops producing current $I_{IN\_SET1}$ and therefore stops charging capacitor $C_{PWMi}$ and the PWMI output while the current $I_{IN\_SET2}$ being continuously produced by current source 630B continuous to discharge the PWMI output and capacitor $C_{PWMi}$. In other words, current source 630B is continuously discharging the PWMI output with the current $I_{IN\_SET2}$ and current source 630A is charging the PWMI output with the current $I_{IN\_SET1}$ whenever switch 622 is enabled or closed.

Current source 630A is made up of external resistor $R_{IN\_SET1}$ and constant reference voltage $V_{REF1}$. The amount of current produced by current source 630A when switch 622 is enabled is based on the value of external resistor $R_{IN\_SET1}$. Current source 630B is made up of external resistor $R_{IN\_SET2}$ and constant reference voltage $V_{REF2}$. The amount of current produced by current source 630B is based on the value of external resistor $R_{IN\_SET2}$.

External resistors $R_{IN\_SET1}$ and $R_{IN\_SET2}$ enable current sources 630A and 630B to be "programmable" or reconfigurable such the amount of current that current sources 630A and 630B are able to produce can be changed by changing the amount of resistance associated with the external resistor $R_{IN\_SET1}$ and $R_{IN\_SET2}$. Changing the resistances of resistors $R_{IN\_SET1}$ and $R_{IN\_SET2}$, and thereby changing the amount of current being output by current sources 630A and 630B when charging or discharging the PWMI output, may change the duty cycle of the PWM signal being output at link 616.

PWM engine 602 includes comparators 640A and 640B. The negative input of comparator 640A is coupled to threshold voltage $V_{PWMI\_H}$ and the positive input of comparator 640A is coupled to the PWMI output. Threshold voltage $V_{PWMI\_H}$ represents a reference voltage source that outputs the maximum or peak voltage level that the PWM signal is allowed to reach during a first phase of the PWM signal at the PWMI output. The positive input of comparator 640B is coupled to threshold voltage $V_{PWMI\_L}$ and the negative input of comparator 640B is coupled to the PWMI output. Threshold voltage $V_{PWMI\_L}$ represents the minimum or "zero" voltage that the PWM signal is allowed to reach during the second phase of the PWM signal at the PWMI output. The outputs of comparators 640A and 640B are both coupled to output control unit 420.

Output control unit 620 represents a circuit, unit, logic, or module that controls switch 422 based on the outputs of comparators 640A and 640B. In the example of FIG. 6, output control unit 620 may include a D-Flip Flop, however in other examples, output control unit 620 may be hardware, software, firmware, or any combination thereof. Output control unit 620 may control switch 622 such that current sources 630A alternates between charging and not charging capacitor $C_{PWMi}$ and the PWMI output in accordance with the desired duty cycle of the PWM signal being output at link 616, while current source 630B continuously discharges capacitor $C_{PWMi}$ and the PWMI output.

Output control unit 620 is configured to generate a PWM signal at the PMWI output (port) by at least alternating, based on a duty cycle of the PWM signal, between coupling charge current source 630A to the PWMI output port and de-coupling current source 630A from the PWMI output port to linearly shape the charge at the PWMI output port in accordance with the duty cycle. Output control unit 620 may be configured to alternate between coupling charge current source 630A to the PWMI output and de-coupling current source 630A from the PWMI output by opening and closing switch 622 in accordance with the duty cycle.

For example, at the start of operations, the logic or circuitry of output control unit 620 may close switch 622 to enable current source 630A during a first phase of the PWM signal. By closing switch 622 in this way, output control unit 620 may charge capacitor $C_{PWMi}$ based on the current $I_{IN\_SET1}$ from current source 630A and cause the voltage at the PWMI output to increase to $V_{PWMI\_H}$ at the same time that the current $I_{IN\_SET2}$ from current source 630B discharges capacitor $C_{PWMi}$ and the PWMI output.

When the voltage at the PWMI output has reached $V_{PWMI\_H}$, output control unit 620 may open, based on the outputs from comparators 640A and 640B, switch 622 to disable current source 630A. In other words, output control unit 620 may open switch 622 during a second phase of the PWM signal. By opening switch 622, output control unit 620 may cause capacitor $C_{PWMi}$ to discharge based on the current $I_{IN\_SET2}$ from current source 630B and further cause the voltage at the PWMI output to decrease back towards $V_{PWMI\_L}$.

When the voltage at the PWMI output has reached $V_{PWMI\_L}$, output control unit 620 may again close, based on the outputs from comparators 640A and 640B, switch 622 to cause capacitor $C_{PWMi}$ to re-charge based on the current $I_{IN\_SET1}$ from current source 630A even though the current $I_{IN\_SET2}$ from current source 630B discharges capacitor $C_{PWMi}$ and the PWMI output. Output control unit 620 may again cause the voltage at the PWMI output to increase back towards $V_{PWMi\_H}$. Output control unit 620 may cause switches 622 to automatically open and close in this way so as to produce a PWM signal at link 616 that bounces between $V_{PWMI\_L}$ and $V_{PWMI\_H}$. However, unlike the PWM signal produced by PWM engine 202 and other PWM engines, the PWM signal produced by PWM engine 602 may have a very accurate duty cycle and frequency that is less sensitive to variations in absolute values of comparator thresholds (e.g., $V_{PWMi\_H}$ and $V_{PWMi\_L}$), absolute value of hysteresis, variations in RC network characteristics, or variations in the current output from current sources 630A and 630B.

Said differently, in some examples, output control unit 620 is configured to couple charge current source 630A to the PWMI output by closing switch 622 which couples charge current source 630A to a reference potential (e.g., in this example GND), and output control unit 620 is configured to decouple charge current source 630A from the PWMI output by opening switch 622. At the same time that output control unit 620 enables and disables current source 630A, current source 630B continuously discharges the PWMI output.

Figure 7:
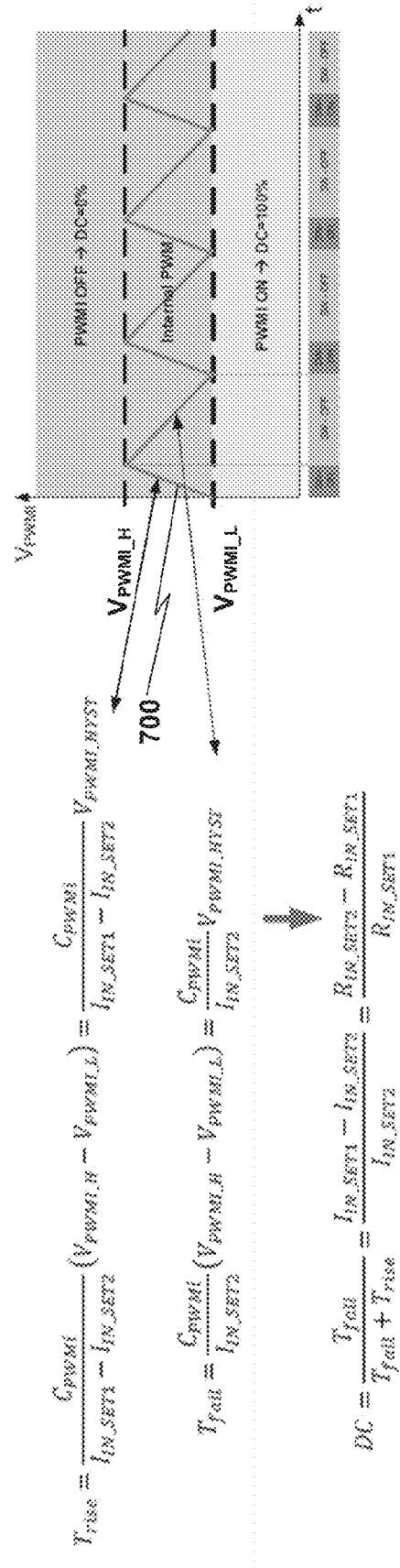
FIG. 7 is a conceptual diagram illustrating a voltage waveform of an example pulse width modulation signal produced by the example modulation engine of FIG. 6, in accordance with one or more aspects of the present disclosure.

FIG. 7 is a conceptual diagram illustrating voltage waveform 700 as an example PWM signal produced by PWM engine 602 of FIG. 6, in accordance with one or more aspects of the present disclosure. In other words, waveform 700 represents the PWM signal that PWM engine 602 may produce at the PWMI output and at link 616.

Waveform 700 illustrates some of the advantages of PWM engine 602 over PWM engine 202 of FIG. 2. As shown in FIG. 7, PWM engine 602 may output a PWM signal at the PWMI output of PWM engine 602 at a linear (or near linear) charge and discharge rate. Therefore, PWM engine 602 may be considered to be more accurate (at least with regards to duty cycle and frequency by maintaining a steady duty cycle and frequency) than other types of PWM engines, such as PWM engine 202, that typically have non-linear charge and discharge timings at their respective PWM outputs.

Consider EQS. 6-8. EQ. 6 defines the rise time $T_{rise}$ associated with the PWM signal that PWM engine 602 outputs at the PMWI output. EQ. 7 defines the fall time $T_{fall}$ associated with the PWM signal that PWM engine 602 outputs at the PMWI output. And EQ. 8 defines the duty cycle DC of the PWM signal that PWM engine 602 outputs at the PMWI output.

$$T_{rise} = \frac{C_{PWMi}}{I_{IN\_SET1} - I_{IN\_SET2}}(V_{PWMI\_H} - V_{PWMI\_L}) = \quad \text{EQ. 6}$$

$$\frac{C_{PWMi}}{I_{IN\_SET1} - I_{IN\_SET2}} V_{PWMI\_HYST}$$

$$T_{fall} = \frac{C_{PWMi}}{I_{IN\_SET2}}(V_{PWMI\_H} - V_{PWMI\_L}) = \frac{C_{PWMi}}{I_{IN\_SET2}} V_{PWMI\_HYST} \quad \text{EQ. 7}$$

$$DC = \frac{T_{fall}}{T_{fall} + T_{rise}} = \frac{I_{IN\_SET1} - I_{IN\_SET2}}{I_{IN\_SET2}} = \frac{R_{IN\_SET2} - R_{IN\_SET1}}{R_{IN\_SET1}} \quad \text{EQ. 8}$$

As shown by EQS. 6-8, regardless as to whether the voltage thresholds $V_{PWMi\_H}$ and $V_{PWMi\_L}$ reach near zero or near maximum voltage levels, the duty cycle (DC) of the accuracy of the duty cycle of the PWM signal being output by PWM engine 602 at link 616 is only dependent on the relationship between the external resistors $R_{IN\_SET1}$ and $R_{IN\_SET2}$. EQ. 8 shows that PWM engine 602 may output a PWM signal at the PWMI output that has a duty cycle which is defined by a ratio between a difference between a second resistance $R_{IN\_SET2}$ of the discharge current source 430B and the first resistance $R_{IN\_SET1}$ of the charge current source 430A a first resistance $R_{IN\_SET1}$ of the charge current source 430A.

Accordingly, like PWM engine 402, PWM engine 602 does not suffer the drawbacks that PWM engine 202 and other types of PWM engines may have (e.g., being very sensitive to: absolute values of comparator thresholds, absolute value of hysteresis, and variations in RC network characteristics). By producing a PWM signal that has a duty cycle defined by EQ. 8, PWM engine 602 is configured to charge and discharge the PWMI output at a constant (or near constant) rate.

Clause 1. A modulation engine for a light-emitting-diode (LED) driver comprising: an output port; a charge current source; a discharge current source; and an output control unit that is configured to generate a modulation signal at the output port by at least alternating, based on a duty cycle of the modulation signal, between coupling the charge current source to the output port and the discharge current source to the output port to linearly shape the charge at the output port in accordance with the duty cycle.

Clause 2. The modulation engine of clause 1, further comprising: a switch coupled to the output port and either the charge current source or the discharge current source, wherein the output control unit is configured to alternate between coupling the charge current source to the output port and the discharge current source to the output port by opening and closing the switch in accordance with the duty cycle.

Clause 3. The modulation engine of clause 2, wherein the duty cycle of the modulation signal is defined by a ratio between a difference between a second resistance of the discharge current source and a first resistance of the charge current source and the first resistance of the charge current source.

Clause 4. The modulation engine of any combination of clauses 1-3, further comprising: a first switch coupled to the output port and the charge current source; and a second switch coupled to the output port and the discharge current source, wherein the output control unit is configured to alternate between coupling the charge current source to the output port and the discharge current source to the output port by: closing the first switch after opening the second switch during a first phase of the modulation signal; and opening the first switch prior to closing the second switch during a second phase of the modulation signal.

Clause 5. The modulation engine of clause 4, wherein the duty cycle of the PWM signal is defined by a ratio between a second resistance of the discharge current source and a sum of a first resistance of the charge current source and the second resistance of the discharge current source.

Clause 6. The modulation engine of any combination of clauses 1-5, wherein: the output control unit is configured to couple the charge current source to the output port by closing a switch that couples the charge current source to a reference potential; and the output control unit is configured to decouple the charge current source from the output port by opening the switch.

Clause 7. The modulation engine of clause 6, wherein: the switch is a first switch; the output control unit is configured to couple the discharge current source to the output port by closing a second switch that couples the discharge charge current source to the reference potential; and the output control unit is configured to decouple the discharge current source from the output port by opening the second switch.

Clause 8. A system comprising: a light emitting diode (LED) driver configured to receive a modulation signal at an input of the LED driver; and a modulation engine configured to generate the modulation signal at the input of the LED driver by at least alternating, based on a duty cycle of the modulation signal, between charging the input of the LED driver and discharging the input of the LED driver to linearly shape a charge at the input of the LED driver in accordance with a duty cycle of the modulation signal.

Clause 9. The system of clause 8, wherein: the modulation engine comprises: a charge current source; and a discharge current source; and the modulation engine is further configured to alternate between charging the input of the LED driver and discharging the input of the LED driver by alternatively coupling the input of the LED driver to the charge current source and the discharge current source accordance with the duty cycle.

Clause 10. The system of clause 9, wherein: the modulation engine further comprises a switch coupled to the input of the LED driver and either the charge current source or the discharge current source; and the modulation engine is further configured to alternate between charging the input of the LED driver and discharging the input of the LED driver by opening and closing the switch in accordance with the duty cycle.

Clause 11. The system of any combination of clauses 9-10, wherein the duty cycle of the modulation signal is defined by a ratio between a difference between a second resistance of the discharge current source and a first resistance of the charge current source and the first resistance of the charge current source.

Clause 12. The system of any of combination of clauses 8-11, wherein: the modulation engine comprises: a charge current source; a discharge current source; a first switch coupled to the input of the LED driver and the charge current source; and a second switch coupled to the input of the LED driver and the discharge current source; and the modulation engine is further configured to alternate between coupling the charge current source to the input of the LED driver and the discharge current source to the input of the LED driver by: closing the first switch after opening the second switch during a first phase of the modulation signal; and opening the first switch prior to closing the second switch during a second phase of the modulation signal.

Clause 13. The system of clause 12, wherein the duty cycle of the modulation signal is defined by a ratio between a second resistance of the discharge current source and a sum of a first resistance of the charge current source and the second resistance of the discharge current source.

Clause 14. The system of any combination of clauses 8-13, further comprising: one or more LED devices, wherein the LED driver is further configured to generate a drive signal at an output of the LED driver, based on the modulation signal, to drive the one or more LED devices.

Clause 15. The system of clause 14, wherein the one or more LED devices are configured to have a dimming attribute that is defined by the duty cycle of the modulation signal.

Clause 16. A system comprising: means for generating a modulation signal at an input of a driver of one or more light emitting diode (LED) devices; and means for alternating, based on a duty cycle of the modulation signal, between charging the input of the driver and discharging the input of the driver to linearly shape a charge at the input of the driver in accordance with a duty cycle of the modulation signal.

Clause 17. The system of clause 16, wherein the means for alternating between charging the input of the driver and discharging the input of the driver further comprise means for alternating between coupling the input of the driver to a charge current source or a discharge current source in accordance with the duty cycle.

Clause 18. The system of clause 17, wherein the duty cycle of the modulation signal is defined by a ratio between a difference between a second resistance of the discharge current source and a first resistance of the charge current source and the first resistance of the charge current source.

Clause 19. The system of any combination of clauses 16-18, wherein the means for alternating between charging the input of the driver and discharging the input of the driver further comprise: means coupling the input of the driver to a charge current source after decoupling the input of the driver from a discharge current source during a first phase of the modulation signal; and means decoupling the input of the driver from the charge current source prior to coupling the input of the driver to the discharge current source during a second phase of the modulation signal.

Clause 20. The system of clause 19, wherein the duty cycle of the modulation signal is defined by a ratio between a second resistance of the discharge current source and a sum of a first resistance of the charge current source and the second resistance of the discharge current source.

Clause 21. The modulation engine of any combination of clauses 1-7, wherein the modulation signal is a pulse-width-modulation signal, a pulse-density-modulation signal, pulse-position modulation signal, pulse-amplitude modulation signal, or pulse-code modulation signal.

Clause 22. The system of any combination of clauses 8-15, wherein the modulation signal is a pulse-width-modulation signal, a pulse-density-modulation signal, pulse-position modulation signal, pulse-amplitude modulation signal, or pulse-code modulation signal.

Clause 23. The system of any combination of clauses 16-20, wherein the modulation signal is a pulse-width-modulation signal, a pulse-density-modulation signal, pulse-position modulation signal, pulse-amplitude modulation signal, or pulse-code modulation signal.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A modulation engine for a light-emitting-diode (LED) driver comprising:
   an output port;
   a charge current source;
   a discharge current source; and
   an output control unit that is configured to generate a modulation signal at the output port by at least alternating, based on a duty cycle of the modulation signal, between coupling the charge current source to the output port and the discharge current source to the output port to linearly shape the charge at the output port in accordance with the duty cycle, wherein the duty cycle of the modulation signal is defined by a ratio between either:
      a difference between a second resistance of the discharge current source and a first resistance of the charge current source and the first resistance of the charge current source; or
      the second resistance of the discharge current source and a sum of the first resistance of the charge current source and the second resistance of the discharge current source.

2. The modulation engine of claim 1, further comprising:
   a switch coupled to the output port and either the charge current source or the discharge current source, wherein the output control unit is configured to alternate between coupling the charge current source to the output port and the discharge current source to the output port by opening and closing the switch in accordance with the duty cycle.

3. The modulation engine of claim 1, further comprising:
   a first switch coupled to the output port and the charge current source; and a second switch coupled to the output port and the discharge current source, wherein the output control unit is configured to alternate between coupling the charge current source to the output port and the discharge current source to the output port by:

closing the first switch after opening the second switch during a first phase of the modulation signal; and opening the first switch prior to closing the second switch during a second phase of the modulation signal.

4. The modulation engine of claim 1, wherein:

the output control unit is configured to couple the charge current source to the output port by closing a switch that couples the charge current source to a reference potential; and the output control unit is configured to decouple the charge current source from the output port by opening the switch.

5. The modulation engine of claim 4, wherein:

the switch is a first switch;

the output control unit is configured to couple the discharge current source to the output port by closing a second switch that couples the discharge charge current source to the reference potential; and the output control unit is configured to decouple the discharge current source from the output port by opening the second switch.

6. A system comprising:

a light emitting diode (LED) driver configured to receive a modulation signal at an input of the LED driver; and a modulation engine comprising a charge current source and a discharge current source, the modulation engine being configured to generate the modulation signal at the input of the LED driver by at least alternating, based on a duty cycle of the modulation signal, between charging the input of the LED driver and discharging the input of the LED driver to linearly shape a charge at the input of the LED driver in accordance with the duty cycle of the modulation signal, wherein the duty cycle of the modulation signal is defined by a ratio between either:

a difference between a second resistance of the discharge current source and a first resistance of the charge current source and the first resistance of the charge current source; or the second resistance of the discharge current source and a sum of the first resistance of the charge current source and the second resistance of the discharge current source.

7. The system of claim 6, wherein:

the modulation engine is further configured to alternate between charging the input of the LED driver and discharging the input of the LED driver by alternatively coupling the input of the LED driver to the charge current source and the discharge current source accordance with the duty cycle.

8. The system of claim 7, wherein:

the modulation engine further comprises a switch coupled to the input of the LED driver and either the charge current source or the discharge current source; and the modulation engine is further configured to alternate between charging the input of the LED driver and discharging the input of the LED driver by opening and closing the switch in accordance with the duty cycle.

9. The system of claim 6, wherein:

the modulation engine comprises:

a first switch coupled to the input of the LED driver and the charge current source; and a second switch coupled to the input of the LED driver and the discharge current source; and the modulation engine is further configured to alternate between coupling the charge current source to the input of the LED driver and the discharge current source to the input of the LED driver by:

closing the first switch after opening the second switch during a first phase of the modulation signal; and opening the first switch prior to closing the second switch during a second phase of the modulation signal.

10. The system of claim 6, further comprising:

one or more LED devices, wherein the LED driver is further configured to generate a drive signal at an output of the LED driver, based on the modulation signal, to drive the one or more LED devices.

11. The system of claim 10, wherein the one or more LED devices are configured to have a dimming attribute that is defined by the duty cycle of the modulation signal.

12. A system comprising:

means for generating a modulation signal at an input of a driver of one or more light emitting diode (LED) devices; and means for alternating, based on a duty cycle of the modulation signal, between charging the input of the driver with a charging current source and discharging the input of the driver with a discharging current source to linearly shape a charge at the input of the driver in accordance with the duty cycle of the modulation signal, wherein the duty cycle of the modulation signal is defined by a ratio between either:

a difference between a second resistance of the discharge current source and a first resistance of the charge current source and the first resistance of the charge current source; or the second resistance of the discharge current source and a sum of the first resistance of the charge current source and the second resistance of the discharge current source.

13. The system of claim 12, wherein the means for alternating between charging the input of the driver and discharging the input of the driver further comprise means for alternating between coupling the input of the driver to a charge current source or a discharge current source in accordance with the duty cycle.

14. The system of claim 12, wherein the means for alternating between charging the input of the driver and discharging the input of the driver further comprise:

means coupling the input of the driver to the charge current source after decoupling the input of the driver from the discharge current source during a first phase of the modulation signal; and means decoupling the input of the driver from the charge current source prior to coupling the input of the driver to the discharge current source during a second phase of the modulation signal.

* * * * *